Sept. 4, 1928.  1,682,733
J. T. ASHTON
SHAKER MECHANISM IN AGRICULTURAL DEVICES
Filed Feb. 17, 1926  3 Sheets-Sheet 3
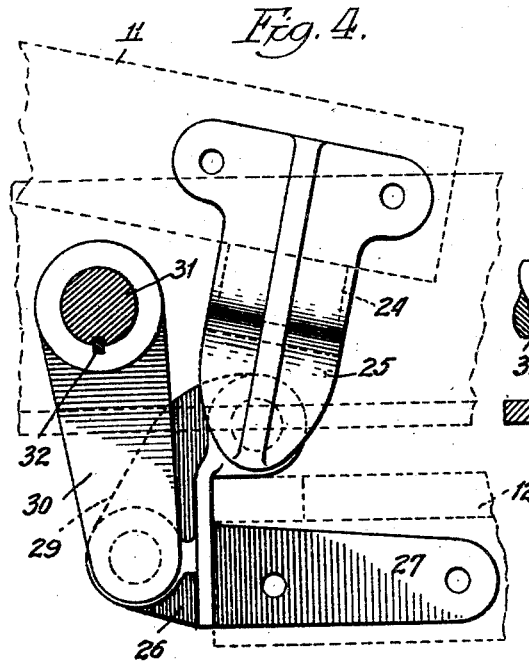
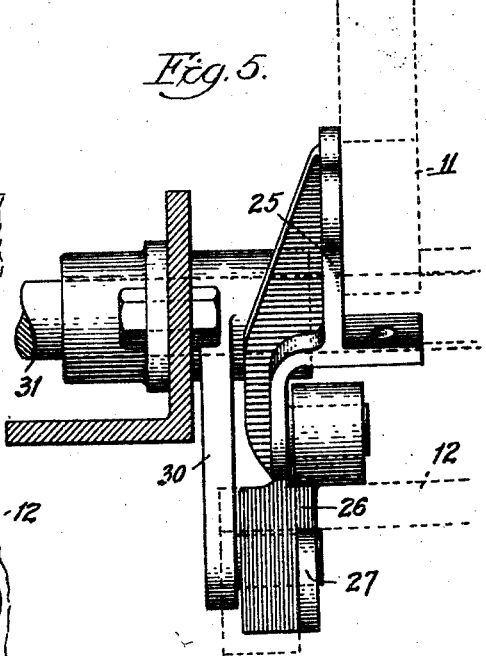
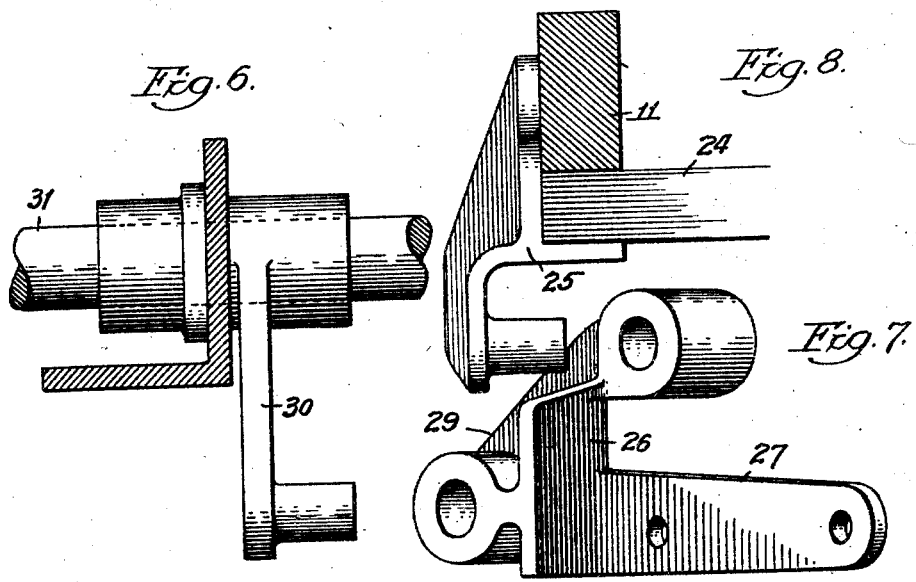
Inventor:
James T. Ashton,
by Wallace R Lane.
Atty.

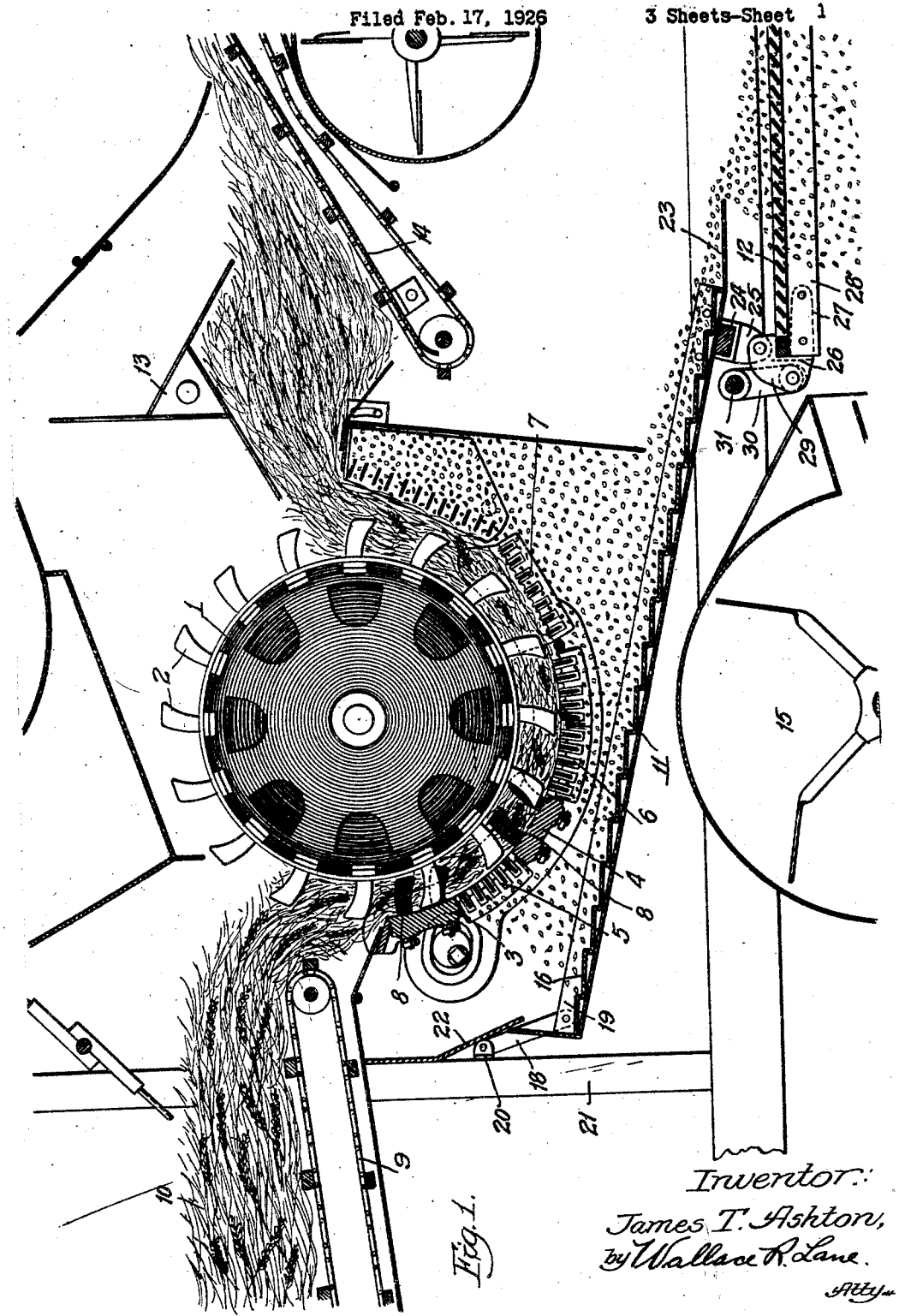

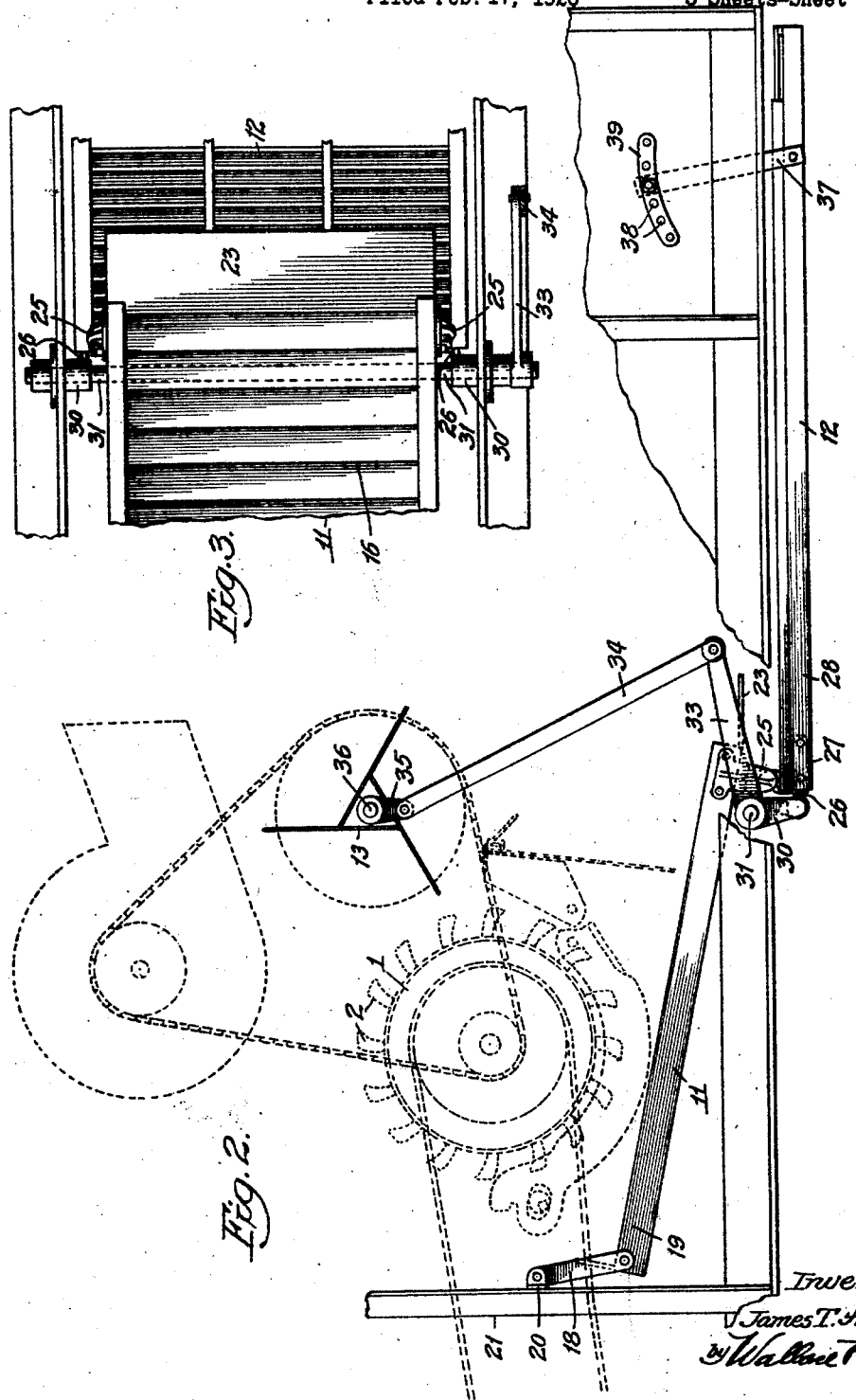

Patented Sept. 4, 1928.

1,682,733

UNITED STATES PATENT OFFICE.

JAMES T. ASHTON, OF BATTLE CREEK, MICHIGAN, ASSIGNOR TO NICHOLS & SHEPARD COMPANY, OF BATTLE CREEK, MICHIGAN, A CORPORATION OF MICHIGAN.

SHAKER MECHANISM IN AGRICULTURAL DEVICES.

Application filed February 17, 1926. Serial No. 88,733.

The present invention relates to agricultural devices, and more particularly to a shaker mechanism therein.

Among the objects of the invention is to provide a novel shaker mechanism in a separating means in agricultural devices, for receiving and shaking the material being discharged from the separating means. Preferably, the shaker mechanism comprises a pan and a shoe so related that the material received by the pan may be fed to the shoe by an oscillation of the pan. The shoe may also be oscillated with and preferably by the same means for oscillating the pan.

The invention also comprehends the providing of novel means for connecting, preferably pivotally, the pan and shoe, together whereby both may oscillate together, and preferably by the same oscillating means. The oscillation of the pan and the shoe may be effected through such connecting means, such as by an arm or the like secured to one of the pivotally connected members of the connecting means, the oscillating means effecting the oscillation action in the pan and shoe through or by way of such arm.

Another feature of the invention is to provide means for pendulously supporting the pan, also the shoe, or both, such as depending links or the like connected to the pan, or the shoe, or both, and preferably with a pendulous member at the forward end of the pan and one at the rear end of the shoe, this latter one being preferably adjustable relative to the vertical so as to give the oscillating shoe a greater or less degree of rise and fall when oscillated, in accordance with the adjusted relation or position of the supporting member or element. In a specific embodiment this means comprises an arc shaped member secured in inclined position on a stationary part of the mechanism, and provided with a plurality of apertures for the selective reception of a connecting pin or pivot element of the supporting link whereby the lateral swing of the lower connecting part of the link may have a greater or less rise and fall when the shoe is oscillated.

Another object of the invention is to provide a shaker mechanism with an inclined pan located to receive the material discharged from the separating means and to feed such material to the shoe by gravity, or by means of the oscillation of the pan, or both, the pan of this invention being preferably inclined rearwardly and downwardly to effect such function whether the mechanism be traveling down hill or over level ground.

The invention comprehends other objects, features, capabilities and advantages as will later appear and are inherently possessed by the invention.

Referring to the drawings, Figs. 1 is a vertical and longitudinal sectional view of an embodiment embodying the invention.

Fig. 2 is a side view in elevation of the same.

Fig. 3 is a top plan view in fragment of an embodiment of the invention.

Fig. 4 is a side view of a connecting means constructed in accordance with the invention.

Fig. 5 is a part transverse sectional view and part end view of the same.

Fig. 6 is a similar view of a detail of the same.

Fig. 7 is a perspective view of the lower member of the connecting means.

And, Fig. 8 is an end view of the upper connecting member together with a fragmentary sectional view of part of the pan.

Referring now more in detail to the drawings, the embodiment selected to illustrate the invention is shown as comprising a separating or threshing mechanism having a rotor 1 carrying teeth 2 cooperating with concaves 3 and 4 and concave grates 5 and 6 and a separating grate 7 cooperating therewith, the concaves 3 and 4 carrying cooperating teeth 8.

An endless conveyor 9 of any suitable type conveys the material 10 to be acted upon into the separating space between the rotor and the concaves, such that the separated kernels, seeds, grain and like crops will fall by gravity into a pan 11 located beneath the concaves and inclined rearwardly and downwardly so that the material thereon may move either by gravity or by reason of the shaking of the pan or by both to the rear end of the pan to be discharged upon a shaker shoe 12, the latter having a plurality of spaced bars through which the grain or crops may pass to a receiving hopper. The material from which the seeds, kernels and other like crops are separated, passes over the top of the separating grate 7 and, under the action of a rotary beater 13, is thrown upon endless conveyors 14 of any suitable type to the rear end of the mechanism, all in accordance with the description in a co-pending application of Lewis J. Brown, Serial No. 89,301 filed Feb.

19, 1926. Beneath the pan 11 is provided a blower 15 having a discharge 16 adapted to direct blasts of air upwardly through the grain passing through and to the shoe 12 for cleaning the same of pieces of straw, dust, chaff and the like.

The shaker mechanism comprises the pan 11 and the shoe 12, of which the pan 11 has a corrugated or serrated top piece 16 so shaped as to effectively throw the grain particles rearwardly when the pan is oscillated. The forward end of the pan is suspended pendulously by means of one or more links 18 pivotally connected at the lower end of each link to a side flange 19 of the pan, and pivotally connected at the upper end of each link to a bracket 20 secured to a vertical post 21 or similar stationary part of the mechanism. A guard plate 22 may be provided to prevent the kernels from passing beyond the front end of the pan and be secured to the post 21 as clearly shown in Fig. 1 of the drawings.

At the rear end of the pan 11 is provided an apron 23 from which the kernels or the like may drop upon the cross bars or slats of the shoe 12, and a transverse piece 24 beneath and rigid with the pan. To the pan and to this piece 24 may be secured, in any suitable manner, one or more brackets 25 serving as one member of the connecting means between the pan and the shoe, the lower end of the bracket 25 being pivotally connected to the upper end of a lower bracket 26 having side arms 27 secured in any suitable manner, as by bolts, to the sides 28 of the shoe 12 and at the forward end thereof, as clearly shown in Fig. 1 of the drawings. The lower member 26 also has a forwardly extending portion 29 to which is pivotally connected a crank or arm 30 secured to a shaft 31 as by a key 32, the shaft 31 extending transversely in the separating mechanism and beneath the pan 11. To the shaft 31 may be secured another arm 33 pivotally connected at its free end to a link or pitman 34, the upper end of the link 34 being pivotally connected to a crank 35 secured to a shaft 36 of the rotary beater 13, the shaft 36 extending transversely through the mechanism and finding suitable bearings in the side walls thereof.

It will be apparent from the above structure that when the shaft 36 rotates with the crank 35, the pitman 34 and crank arm 33 will be given an oscillating movement as well as the arm 30. The latter in turn will oscillate the bracket 26 with the shoe 12 in a longitudinal direction of the same, and by reason of the bracket 25 being pivotally connected to the bracket 26, a similar movement will be effected in the pan 11, the forward end of the pan swinging pendulously by means of the link 18.

Toward the rear end of the shoe 12 may be pivotally connected one or more pendulous links 37, the upper ends of these links carrying pivot pins adapted to be engaged in any one of a series of apertures 38 provided in an arc shaped member 39 suitably secured to the side walls of the separating mechanism, as clearly shown in Fig. 2 of the drawings. It will be apparent from this arrangement that the rear end of the shoe 12 may pendulously swing by the links 37, and by adjusting the upper end of the links 37 into any selected aperture 38, the link may be either in upright or vertical position or in inclined position, such that when in inclined position the shoe may have a component rise and fall at the rear end thereof greater than when the link is in a more upright or vertical position, thus effecting a greater or less agitation of the material on the bars of the shoe 12. In this way the degree of agitation of the material on the shoe 12 may be adjusted as desired.

Having thus described and upon the drawings shown an illustrative embodiment of the invention, it is to be understood that the invention is not limited thereto but comprehends other details, arrangements of parts, features and constructions without departing from the spirit thereof.

Having thus disclosed the invention, I claim:

1. In a shaker mechanism for agricultural separating means, connecting means for connecting a pan to a shoe and comprising a bracket secured to said pan, a bracket secured to said shoe, and means for pivotally connecting said brackets together.

2. In a shaker mechanism for agricultural separating means, connecting means for connecting a pan to a shoe and comprising a bracket secured to said pan, a bracket secured to said shoe, means for pivotally connecting said brackets together, and oscillating means pivotally connected to one of said brackets for oscillating the brackets and said pan and shoe.

3. In a shaker mechanism for agricultural separating means, connecting means for connecting a pan to a shoe and comprising a downwardly extending member on said pan, an upwardly extending member on said shoe, means for pivotally connecting said members, and means for oscillating said pan and shoe.

4. In a shaker mechanism for agricultural separating means, connecting means for connecting a pan to a shoe and comprising a downwardly extending member on said pan, an upwardly extending member on said shoe, means for pivotally connecting said members, a crank arm secured to said upwardly extending member, and means to oscillate said arm for oscillating said pan and shoe.

5. In an agricultural device comprising separating means, means for shaking the separated material and comprising a pan, a shoe, means connecting said pan and shoe, and means for oscillating said pan and shoe, said connecting means comprising a member secured to the shoe and having a plurality of pivotal portions, a member secured to said pan and having a pivotal portion pivotally connected to one of the pivotal portions of the previously mentioned member, and said oscillating means being pivotally connected to another of the pivotal portions of said first mentioned member.

6. An agricultural device comprising separating means, means for shaking the separated material and comprising a pan, a shoe, means for pivotally connecting said shoe and said pan, and comprising projections on said pan and said shoe and extending toward each other and being pivotally connected at the extended portions thereof, and means for oscillating said pan and said shoe and comprising a pivotal connection with the projection on said shoe.

7. An agricultural device comprising separating means, means for shaking the separated material and comprising a pan, a shoe, means connecting said pan and said shoe and comprising projections on said pan and said shoe and extending toward each other and being pivotally connected at the extended portions thereof, and oscillating means connected to said connecting means for effecting an oscillation of said pan and shoe through said connecting means and comprising pivotal connection with the projection on said shoe.

8. A shaker mechanism for agricultural separating means, comprising a pan inclined rearwardly and downwardly, a shoe located to receive the material discharged from the rear and lower end of said pan and disposed in a substantially horizontally position, means for pendulously supporting said pan and said shoe whereby the same may be oscillated, means for pivotally connecting said pan and shoe, and means connected to said shoe for oscillating said pan and said shoe.

In witness whereof I hereunto subscribe my name to this specification.

JAMES T. ASHTON.